July 5, 1966   J. MERCIER ETAL   3,259,147
PRESSURE VESSEL
Filed Oct. 12, 1964
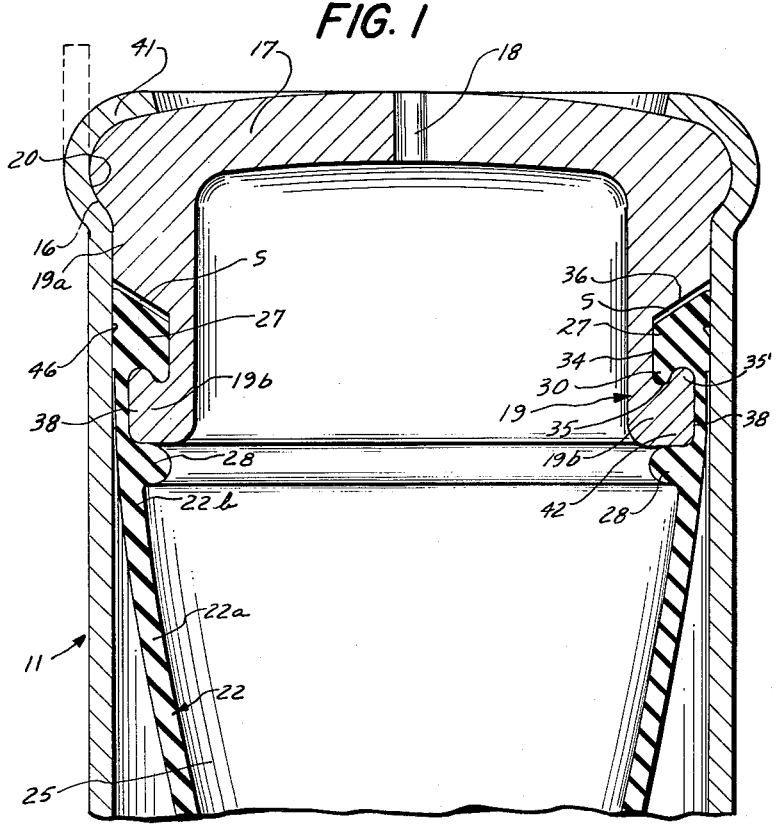
FIG. 1
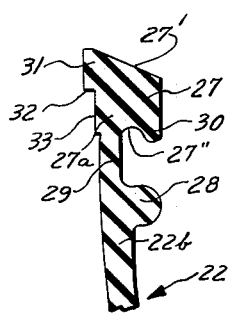
FIG. 2
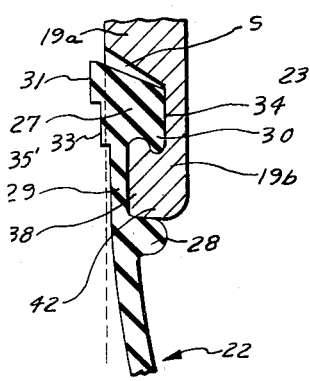
FIG. 3
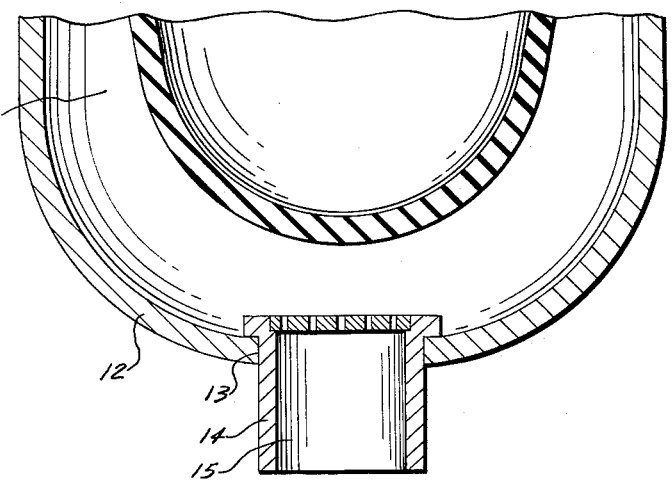
INVENTOR
JEAN MERCIER
JACQUES H. MERCIER
BY
Dean Fairbanks + Hirsch
ATTORNEYS

United States Patent Office 3,259,147
Patented July 5, 1966

3,259,147
PRESSURE VESSEL
Jean Mercier and Jacques H. Mercier, New York, N.Y.; said Jacques H. Mercier assignor to Mercier Olaer Patent Corporation, Wilmington, Del., a corporation of Delaware
Filed Oct. 12, 1964, Ser. No. 403,306
4 Claims. (Cl. 138—30)

This application is a continuation-in-part of application Serial No. 371,584, filed June 1, 1964.

This invention relates to the art of pressure vessels of the type having a deformable partition intervening between the gas and oil port thereof and more particularly to the mount for said partition.

It is among the objects of the invention to provide a pressure vessel of the above type which may be readily fabricated at relatively low cost and may readily be assembled with assurance that a dependable seal will be provided to prevent leakage of both the oil and gas in the pressure vessel even with long continuous use thereof.

According to the invention, these objects are accomplished by the arrangement and combination of elements hereinafter described and more particularly recited in the claims.

In the accompanying drawings in which is shown one of various possible embodiments of the several features of the invention, FIG. 1 is a longitudinal sectional view of the pressure vessel according to the invention, FIG. 2 is a detail view of the periphery of the deformable partition, and FIG. 3 is a detail view of the periphery of the partition mounted on the closure member before it is positioned in the container of the pressure vessel.

Referring now to the drawings, in the embodiment shown in FIG. 1, the pressure vessel comprises a container 11 of strong, rigid material such as steel or aluminum capable of withstanding the pressure to which the unit is subjected. The container is cylindrical along the major portion of the body thereof and has a hemispherical end 12 which has an opening 13 in which an outlet member 14 is mounted having a port 15 through which fluid such as oil under pressure may flow.

The cylindrical portion of the container 11 at the mouth thereof is of larger diameter than the main body of the container, defining a curved shoulder 16. The mouth of the container 11 is designed to be closed by a substantially cup-shaped cover member 17 which as shown in FIG. 1 has an axial opening 18 designed to receive a suitable air connection (not shown).

The side wall 19 of the cover member 17 defines a substantial cylindrical portion adapted to fit into the cylindrical mouth of the container 11.

As shown in FIG. 1, the outer periphery of the cover member is curved in vertical cross section as at 20 so that it may seat on the correspondingly curved shoulder 16 of the container. The portion 19a of said cylindrical portion 19 is of outer diameter substantially the same as the inner diameter of the container adjacent the curved shoulder 16 thereof so that it will fit snugly therein to center the cover member in the container. The lower portion 19b of cylindrical portion 19 is of outer diameter less than the inner diameter of the container to define a space therebetween to receive the periphery of a deformable partition 22.

The partition 22 illustratively is a collapsible and expansible bladder having an enlarged mouth and which desirably is of resilient material such as rubber or synthetic plastic of like physical characteristic. The bladder defines two chambers in the pressure vessel, i.e., an oil chamber 23 which is in communication with the passageway 15 through the outlet member 14 and a gas chamber 25 which is in communication with the opening 18.

The mouth of the bladder 22 on the inner surface thereof has two annular beads 27, 28 formed integral therewith and spaced from each other as at 29. As is clearly shown in FIG. 2, the bead 27 which is at the mouth or rim of the bladder, has its top surface 27' inclined downwardly from the outer surface of the bladder to the inner portion thereof and the portion of the bead 27 remote from the top surface 27' thereof has an annular groove 27" thereby defining an annular hook conformation 30 on the inner periphery of bead 27.

As is clearly shown in FIG. 2, the outer surface of the bladder 22 has an annular outwardly extending flange 31 formed integral therewith with the lower surface of the flange 31 preferably defining a right angle as at 32 with respect to the adjacent wall surface 33 and preferably a corresponding rounded outside angle of the bead 27.

In order to support the bladder 22, the cylindrical portion 19b of the cover member 16 has an annular groove 34 in its outer surface designed to receive the annular bead 27.

As is clearly shown in FIG. 1, the upper wall 36 of groove 34 is preferably inclined upwardly from the side wall of the groove 34 and the lower wall of the groove 34 has an annular groove 35 defining a hook conformation 35' complementary to the hook conformation 30 of bead 27.

The length of the bladder portion 29 between the beads 27, 28 is slightly less than the length of the wall portion 38 of cylindrical portion 19b of the cover member 17 for the purpose hereinafter set forth.

The beads 27, 28 are of transverse thickness such that when the bladder 22 is mounted on the cover member 17 with the bead 27 positioned in groove 34 and with bead 28 positioned below the lower end 42 of the cylindrical portion 19, respectively, prior to insertion of the cover member and bladder 22 into the container as shown in FIG. 3, the outer surface of flange 31 will extend beyond the cylindrical portion 19a of the cover member 17, and preferably the remaining portion 33 of the bead 27 will also extend beyond such cylindrical portion 19a. The transverse thickness of the wall portion 29 of bladder 22 between beads 27, 28 is preferably less than the distance between the outer periphery of portion 38 of cylindrical portion 19b of cover member 17 and a line extending longitudinally of the cover member parallel to the longitudinal axis of the container from the cylindrical portion 19a. Furthermore, the inner diameter of the mouth of the bladder is less than the outer diameter of the cylindrical portion 19b of the cover member 17 and the inner diameter of the bead 27 is substantially equal to or slightly less than the diameter of the side wall of groove 34 so that the bead 27 will fit snugly in said groove.

With the construction above described, to assemble the pressure vessel, the cover member 17 is inserted into the mouth of the bladder so that the hook conformation 30 of bead 27 coacts with the hook conformation 35' of annular groove 34. When so positioned there will be a space S between the top surface 27' of bead 27 and the upper wall 36 of groove 34 and the inner surface of bead 27 will fit snugly against the side wall of groove 34. Thereupon, the bladder is pulled slightly so that tension will be exerted on the wall portion 29 thereof and the bead 28 is snapped beneath the lower edge 42 of the cylindrical portion 19 of the cover member 17.

Inasmuch as the inner diameter of the bladder adjacent bead 28 is less than that of the outer periphery 38 of cylindrical portion 19b, it will securely remain beneath such edge 42 and the engagement of the complementary hook portions 30, 35' of the bead 27 and the groove 34 respectively will enhance the retention of the bead 27 in fixed position in groove 34 thereby maintaining tension on the intervening portion 29.

The cover member with the bladder thus mounted thereon may then be forced into the container 11 until the rounded portion 20 of the cover member 17 is against the curved shoulder 16. The cover member is secured in position by bending over the rim 41 of the container from the position shown in broken lines in FIG. 1 to the position shown in full lines.

With the cover member so mounted, the bead 27 will be transversely compressed into groove 34 and the dimensions of the bead 27 and the groove 34 are so selected that when so compressed there may still be a space S remaining therebetween. By reason of the annular flange 31, which extends beyond the outer surface 33 of the bead, such flange will be compressed even more than the portion 33 of bead 27 adjacent thereto thereby creating a sharply defined annular region 46 at the edge 32 of flange 31.

When the cover member with the bladder 22 mounted thereon is forced into the container, although there will be frictional resistance due to the compressed bead 27, the bead 27 will not be dislodged from groove 34 by reason of the fact that the bead 28 is snapped beneath the end 42 of the cover member 27 and securely retained in such position and the tensed portion 29 of the bladder will retain the complementary hook conformations 30, 35' in engagement.

As a result, there will be no displacement of bead 27 from groove 34 which could cause cutting of the bead and in addition destroy the seal effected thereby.

Futhermore, since bead 28 is securely retained in position it will not ride up into the space between the cylindrical portion 19b and the shell which could prevent assembly of the cover member into the container and also would eliminate the tension on the portion 29 of the bladder.

By reason of the fact that the thickness of the wall portion 29 is preferably slightly less than the distance between the outer surface 38 of the cylindrical portion 19b and the adjacent surface of the shell, only the flange 31 of bead 27 will extend substantially outwardly and hence when the cover member with the bladder 22 mounted thereon is forced into the container it will move relatively freely therein and there will be no excessive pressure required to move the cover member in place and possibly cause displacement of the beads from their desired position.

By reason of the optional space S between the bead 27 and the groove 34, although the bladder has a tendency to swell in certain hydraulic fluid, the optional space S will accommodate the swelling of bead 27 and prevent actual distortion of the adjacent surface of the container which, when the bead later contracted, would leave a gap causing failure of the seal effected by the bead 27.

In operation of the pressure vessel, the gas chamber defined by the bladder 22 is charged with gas under pressure and then the oil chamber is charged with oil under pressure greater than that of the gas in chamber 25.

As the oil flows into and out of the chamber 23 during use of the pressure vessel to dampen shock waves in a pressure line, for example, the bladder 22 will contract and expand, such expansion exerting stretching tension on the main wall portion 22a thereof. By reason of the fact that the wall portion 29 of the bladder at the mouth thereof is maintained under tension due to the secure retention of the beads 27, 28, the lowermost bead 28 and adjacent portion 22b of the bladder 22 will take up such stretching tension and none will be imparted by reason of the stretching of the bladder during operation, to the bead 27 so that the sealing action provided by such bead will not be impaired.

In the event oil under pressure in chamber 23 should leak past the compressed outer surface 33 of bead 27, the peripheral seal effected by the compressed flange 31 will prevent leakage. In addition, by reason of the sharp step 46 provided by the lower edge 32 of flange 31, the oil under pressure would exert force against shoulder 32 provided by said flange thereby enhancing the sealing action provided by the bead 27 to prevent leakage of oil from the container.

During use of the pressure vessel, when oil is forced from the chamber 23 through the port 15, the pressure in the bladder 22 will exceed that in the chamber 23. In the event that the bead 28 should move outwardly slightly so that the gas under pressure should exert force against the bead 27, since the pressure exteriorly of annular groove 34 is atmospheric, and the gas pressure is much greater, the hook conformation 30 of bead 27 will move laterally inward against the side wall of groove 34 enhancing the sealing action.

With the arrangement above described, a pressure vessel of the type having a deformable bladder therein has been provided which may readily be assembled with assurance that a dependable seal will be maintained to prevent leakage of oil and gas from the unit.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A pressure vessel comprising a rigid hollow container having an enlarged diameter mouth and having a port at the other end, a cover member positioned in the mouth of said container, said cover member having a port, means securely to retain said cover member in place, a flexible bladder of resilient deformable material positioned in said container and intervening between said ports, said bladder having an enlarged mouth with two spaced annular beads positioned on the inner side of the bladder at said mouth, said cover member having a cylindrical portion extending into the container and transversely spaced therefrom, said cylindrical portion having an annular groove on its outer surface accommodating the annular bead most adjecent the opening of the mouth of the bladder, the wall of said annular groove remote from the inner end of said cylindrical portion being inclined upwardly from the inner end of the groove to the outer portion thereof, the adjacent surface of the bead in said groove having an inherent inclination less than that of said inclined wall, said first bead having a laterally outwardly extending annular flange on its outer surface and the remaining portion of said bead being of thickness such as to be compressed laterally when said cover member with the bladder mounted thereon is positioned in said container, whereby said flange portion will be under greater compression than the remaining portion of said first bead, with the lower edge of said flange defining a relatively sharp step with respect to the outer surface of the remaining portion of said first bead, the distance between said annular beads being inherently such that when said first bead is under compression the free end of the extending portion of said cylindrical portion will react against said second bead thereby maintaining the portion of the bladder between the beads under tension.

2. The combination set forth in claim 1 in which the thickness of the bladder wall between said two beads is slightly less than the transverse distance between the cylindrical portion of the cover member between the beads and the adjacent wall of the container to facilitate movement of said cover member with the bladder mounted thereon, into the mouth of the container.

3. The combination set forth in claim 1 in which said first annular bead has an annular groove in its undersurface, said groove with said bead defining a hook conformation and the adjacent surface of said annular groove in said cylindrical portion has a complementary hook conformation engaged by the hook conformation of said bead.

4. The combination set forth in claim 1 in which the wall of said annular groove remote from the inner end of said cylindrical portion is spaced from the adjacent surface of the first bead positioned in said groove to define a recess.

References Cited by the Examiner

UNITED STATES PATENTS

| | | | |
|---|---|---|---|
| 2,740,259 | 4/1956 | Westlund | 138—30 X |
| 2,764,103 | 9/1956 | Mercier | 138—30 |
| 2,893,433 | 7/1959 | MacDuff | 138—30 |
| 3,015,510 | 1/1962 | Bates | 277—207 |
| 3,067,776 | 12/1962 | Love | 138—30 |
| 3,081,102 | 3/1963 | Murray et al. | 277—207 |

LAVERNE D. GEIGER, *Primary Examiner.*
LEWIS J. LENNY, *Examiner.*
H. ARTIS, *Assistant Examiner.*